(12) United States Patent
Herrick et al.

(10) Patent No.: US 8,540,458 B2
(45) Date of Patent: Sep. 24, 2013

(54) CENTER HOLE RAM CABLE PULLER

(75) Inventors: Rod Herrick, Morgan Hill, CA (US); John Michael Thomas, San Jose, CA (US)

(73) Assignee: Roodle, Inc., San Martin, CA (US)

( * ) Notice: Subject to any disclaimer, the term of this patent is extended or adjusted under 35 U.S.C. 154(b) by 0 days.

(21) Appl. No.: 13/160,430

(22) Filed: Jun. 14, 2011

(65) Prior Publication Data
US 2012/0321391 A1 Dec. 20, 2012

(51) Int. Cl.
*F16L 55/18* (2006.01)
(52) U.S. Cl.
USPC .................................... 405/184.3; 405/184.1
(58) Field of Classification Search
USPC ............... 405/184, 184.1, 184.3, 154.1, 156; 30/92; 254/245
See application file for complete search history.

(56) References Cited

U.S. PATENT DOCUMENTS

| | | |
|---|---|---|
| 652,367 A | 6/1900 | Law |
| 928,361 A | 7/1909 | Cockburn |
| 944,141 A | 12/1909 | Mounts |
| 1,001,205 A | 8/1911 | Lovell |
| 1,519,882 A | 12/1924 | Stewart |
| 1,618,368 A | 2/1927 | Dietle |
| 1,638,494 A | 8/1927 | Lewis |
| 1,717,588 A | 6/1929 | Small |
| 1,719,449 A | 7/1929 | Rauko |
| 2,163,384 A | 6/1939 | Stevens |
| 2,203,158 A | 6/1940 | Klein |
| 2,360,425 A | 10/1944 | Kinzbach |
| 2,392,495 A | 1/1946 | Nameth |
| 2,502,711 A | 4/1950 | Evans |
| 2,534,858 A | 12/1950 | Ellis |
| 2,598,930 A | 6/1952 | Murphy |
| 2,638,165 A | 5/1953 | Barber |
| 2,662,276 A | 12/1953 | Sheaffer |
| 2,803,301 A | 8/1957 | Warner |

(Continued)

FOREIGN PATENT DOCUMENTS

| | | |
|---|---|---|
| DE | 29521163 | 11/1996 |
| EP | 0094694 | 11/1983 |

(Continued)

OTHER PUBLICATIONS

Ryan and Sons Pipeline Insertion Machine literature, 1983, 12 pages.

(Continued)

*Primary Examiner* — Thomas B Will
*Assistant Examiner* — Jessica H Lutz
(74) *Attorney, Agent, or Firm* — Robin Kelson (57) ABSTRACT

A center hole ram can have a barrel, and a piston that is moveable relative to the barrel. The piston can define an axial hole that extends through the piston. A gripping assembly can be attached to the ram. The gripping assembly can be configured to grip a cable and pull the cable through the axial hole in response to multiple actuating strokes of the ram. Also, a bursting head can be attached to a cable. The cable can be pulled through a tunnel (such as an existing pipe) and through a piston of a ram. Pulling the cable can result in the cable pulling the bursting head through the tunnel toward the ram. Also, pulling the cable can include gripping the cable with a gripping assembly attached to the ram, and actuating the ram.

10 Claims, 8 Drawing Sheets

(56) References Cited

U.S. PATENT DOCUMENTS

| | | | |
|---|---|---|---|
| 2,834,106 | A | 5/1958 | Conder |
| 2,846,193 | A | 8/1958 | Chadderdon |
| 2,947,253 | A | 8/1960 | Cirilo |
| 2,983,042 | A | 5/1961 | Frantz et al. |
| 2,999,541 | A | 9/1961 | Kinzbach et al. |
| 3,005,493 | A | 10/1961 | Crowe et al. |
| 3,023,040 | A | 2/1962 | Cawley et al. |
| 3,073,389 | A | 1/1963 | Conner |
| 3,114,416 | A | 12/1963 | Kammerer |
| 3,181,302 | A | 5/1965 | Lindsay |
| 3,266,776 | A | 8/1966 | Catu |
| 3,341,930 | A | 9/1967 | Belanger |
| 3,474,946 | A | 10/1969 | Desplats et al. |
| 3,543,377 | A | 12/1970 | Bremner |
| 4,003,122 | A | 1/1977 | Overmyer et al. |
| 4,100,980 | A | 7/1978 | Jenne |
| 4,118,940 | A | 10/1978 | Beane |
| 4,146,347 | A | 3/1979 | Woods |
| 4,427,180 | A | 1/1984 | Brieuc |
| 4,456,226 | A | 6/1984 | Stumpmeier |
| 4,505,302 | A | 3/1985 | Streatfield et al. |
| 4,507,019 | A * | 3/1985 | Thompson ............. 405/184.3 |
| 4,538,522 | A | 9/1985 | Kelley |
| 4,593,884 | A | 6/1986 | Zschocke et al. |
| 4,615,509 | A | 10/1986 | Biass |
| 4,634,313 | A | 1/1987 | Robbins |
| 4,637,756 | A | 1/1987 | Boles |
| 4,674,914 | A | 6/1987 | Wayman et al. |
| 4,693,404 | A | 9/1987 | Wayman et al. |
| 4,720,211 | A | 1/1988 | Streatfield et al. |
| 4,738,565 | A | 4/1988 | Streatfield et al. |
| 4,874,152 | A | 10/1989 | Roberts et al. |
| 4,928,866 | A | 5/1990 | Carruthers |
| 4,936,710 | A | 6/1990 | Petty et al. |
| 5,076,731 | A | 12/1991 | Luksch |
| 5,171,106 | A | 12/1992 | Rockower et al. |
| 5,173,009 | A | 12/1992 | Moriarty |
| 5,185,839 | A * | 2/1993 | Newell et al. ............ 385/90 |
| 5,192,165 | A | 3/1993 | Torielli |
| 5,205,671 | A | 4/1993 | Handford |
| 5,211,509 | A | 5/1993 | Roessler |
| 5,328,297 | A | 7/1994 | Handford |
| 5,482,404 | A | 1/1996 | Tenbusch, II |
| 5,507,597 | A | 4/1996 | McConnell |
| RE35,271 | E | 6/1996 | Fisk et al. |
| 5,628,585 | A | 5/1997 | Parish, II et al. |
| RE35,542 | E | 6/1997 | Fisk et al. |
| 5,775,841 | A | 7/1998 | Pajunen |
| 5,785,458 | A | 7/1998 | Handford |
| 5,816,745 | A | 10/1998 | Tenbusch, II |
| 5,876,152 | A | 3/1999 | Hesse |
| 5,997,215 | A | 12/1999 | Schwert |
| 6,098,708 | A | 8/2000 | Jenne |
| 6,109,831 | A | 8/2000 | Handford |
| 6,109,832 | A | 8/2000 | Lincoln |
| 6,149,349 | A | 11/2000 | Nikiforuk et al. |
| 6,305,880 | B1 | 10/2001 | Carter et al. |
| 6,357,967 | B1 * | 3/2002 | Putnam ............. 405/184.3 |
| 6,491,476 | B2 | 12/2002 | Hesse |
| 6,524,031 | B2 | 2/2003 | Carter et al. |
| 6,588,983 | B1 | 7/2003 | Tenbusch, II |
| 6,652,190 | B1 | 11/2003 | Verkyk |
| 6,672,802 | B2 * | 1/2004 | Putnam ............. 405/184 |
| 6,793,442 | B2 | 9/2004 | Carter et al. |
| 6,799,923 | B2 | 10/2004 | Carter et al. |
| 7,140,806 | B2 * | 11/2006 | Wentworth et al. ......... 405/184 |
| 2002/0081154 | A1 | 6/2002 | Herrick et al. |
| 2002/0110425 | A1 | 8/2002 | Hesse |
| 2005/0042036 | A1 | 2/2005 | Carter et al. |
| 2006/0088384 | A1 * | 4/2006 | Putnam ............. 405/184.1 |
| 2006/0193697 | A1 * | 8/2006 | Wentworth et al. ......... 405/184 |
| 2011/0250020 | A1 | 10/2011 | Carter et al. |

FOREIGN PATENT DOCUMENTS

| | | |
|---|---|---|
| EP | 0124796 | 12/1984 |
| EP | 0397270 | 5/1990 |
| FR | 2475805 | 8/1981 |
| GB | 2139938 | 11/1984 |
| JP | 1190831 | 7/1989 |
| JP | 7330291 | 12/1995 |
| WO | WO9830350 | 7/1998 |
| WO | WO2009026262 | 2/2009 |

OTHER PUBLICATIONS

Miller Xpandit Brochure, 1994, 8 pages.
Poweram Model 1915, Oct. 19, 2000, 2 pages.
Mini-Ram Model 1425, Oct. 19, 2000, 2 pages.
Mini-Ram Model 1825, Oct. 19, 2000, 2 pages.
Poweram Model 2020, Oct. 19, 2000, 2 pages.
Poweram Model 7000, Oct. 19, 2000, 4 pages.
The Vermeer Hydroburst Pipe-Bursting Process, cited in an IDS dated Sep. 17, 2004 in U.S. Appl. No. 10/944,089, 6 pages.
Power Team Post Tensioning Ram (PTR) Literature, cited in an IDS dated Sep. 17, 2004 in U.S. Appl. No. 10/944,089, 3 pages.
Grundoburst Service System, cited in an IDS dated Sep. 17, 2004 in U.S. Appl. No. 10/944,089, 1 page.
Trenchless Technologies Produce Bottle-Tight Sewer System, Public Works, Jul. 1995, 2 pages.
Pipe Bursting Replaces Sewer Line, Texas Construction Magazine, Oct. 1997, 2 pages.
Pipe Bursting Water Mains Surges in N. America, Public Works, Oct. 1996, 3 pages.
Service Line Splitting and Extraction with Grundocrack, Jr., cited in an IDS dated Sep. 17, 2004 in U.S. Appl. No. 10/944,089, 7 pages.
Bell, Terry, Declaration, Apr. 18, 2003, 10 pages.
Wentworth, Steven W., Declaration of Steven W. Wentworth, Jul. 16, 2003, 16 pages.
Carter, Robert W., Light Compact Trenchless Method for Replacing Buried Pipes, U.S. Appl. No. 60/035,174, filed Jan. 9, 1997, 11 pages.
Carter, et al., Trenchless Water Pipe Replacement Device and Method, U.S. Appl. No. 60/312,387, filed Aug. 14, 2001, 33 pages.
Carter, et al., Devices and Methods for Trenchless Replacement of Underground Pipe, U.S. Appl. No. 60/956,672, filed Aug. 17, 2007, 81 pages.
Pipe Genie Manufacturing Inc., "Trenchless Pipe Bursting Equipment", retrieved from http://www.pipegenie.com/ on Mar. 10, 2011.
Hammerhead Trenchless Equipment, "Portaburst Lightning Powerful, Compact Lateral Pipe Bursting System", Copyright Notice Date: 2008.

* cited by examiner

CENTER HOLE RAM CABLE PULLER

BACKGROUND

It can be useful to pull cables in different applications. For example, in pipe bursting, a pipe bursting head can be pulled through an existing pipe in the ground to burst the existing pipe. To pull the bursting head, a pulling apparatus using hydraulic cylinders may be positioned at one end of a pipe and used to pull a cable attached to the bursting head from an opposite end of the pipe. A pipe bursting head is a device that is sized and configured to burst a pipe as the pipe bursting head is pulled through the pipe. One example of a bursting head can have a generally conical shape with a minimum diameter that fits inside the pipe and a maximum diameter that exceeds the diameter of the pipe. Bursting heads can also include fins that are sharp and concentrate stress at one or more locations on the inside of the pipe to encourage the pipe to fracture as the bursting head is pulled through the pipe. The bursting head can be attached to a replacement pipe so that as the existing pipe is burst, the new pipe can be pulled in behind the bursting head.

A center hole ram is an existing type of ram with a piston that defines an axial hole passing through the piston in a direction of the piston's travel. The hole through the piston may be in any of various different shapes, and the hole may or may not be centered in the ram or in the piston itself.

SUMMARY

The description below relates to an apparatus that uses a center hole ram and a gripping assembly attached to the ram to pull a cable through a hole in the piston of the ram. The cable may be attached to a bursting head so that pulling the cable also pulls the bursting head.

According to one aspect, a center hole ram can have a barrel, and a piston that is moveable relative to the barrel. The piston can define an axial hole that extends through the piston. A gripping assembly can be attached to the center hole ram. The gripping assembly can be configured to grip a cable and pull the cable through the axial hole in response to multiple actuating strokes of the center hole ram.

According to another aspect, a bursting head can be attached to a cable. The cable can be pulled through a tunnel and through a piston of a center hole ram. Pulling the cable can result in the cable pulling the bursting head through the tunnel toward the center hole ram. Also, pulling the cable can include gripping the cable with a gripping assembly attached to the center hole ram and actuating the center hole ram.

According to yet another aspect, a bursting head can be attached to a pipe to be installed. The bursting head can be attached to a cable without using a swaged end of the cable. The cable can be pulled through an existing pipe and through a piston of a center hole ram. Pulling the cable can result in the cable pulling the bursting head and the pipe to be installed through the existing pipe and toward the center hole ram. Pulling the cable can include gripping the cable with a pulling gripper of the gripping assembly while actuating the piston in a pulling stroke and inhibiting rotation of the pulling gripper relative to a frame that is secured to the center hole ram. The pulling gripper can squeeze the cable tighter as the pulling gripper applies additional pulling force to the cable. Pulling the cable can also include holding the cable with a holding gripper while actuating the piston in a recovery stroke that readies the piston for an additional pulling stroke. The holding gripper can squeeze the cable tighter as the cable applies additional force to the holding gripper. Additionally, the bursting head can be removed from an end of the cable, and the end of the cable can be fed through the piston of the center hole ram.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

The description and drawings may refer to the same or similar features in different drawings with the same reference numbers.

DETAILED DESCRIPTION

I. The Overall Pipe Bursting Apparatus

Figure 1:
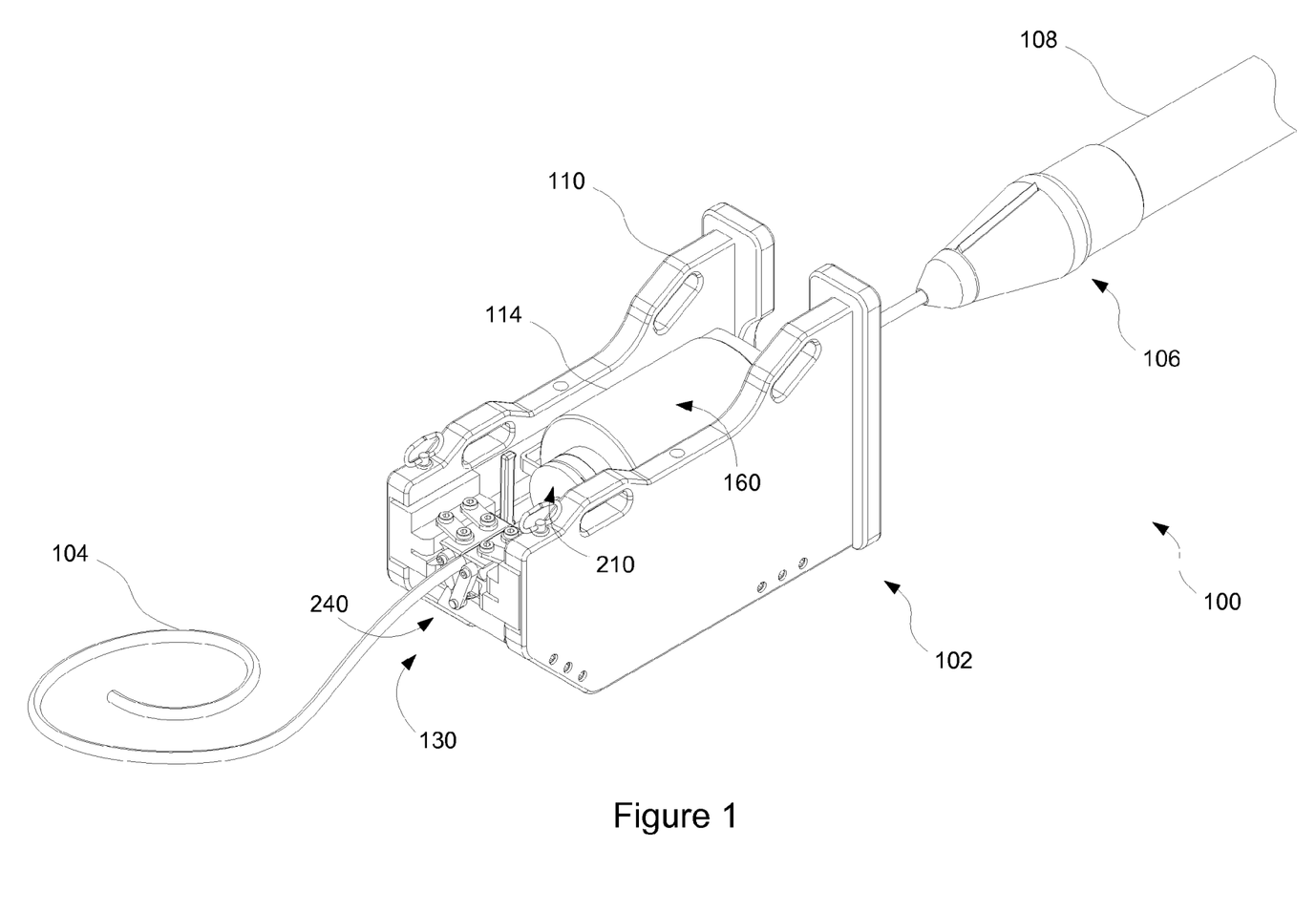
FIG. 1 is a rear perspective view of a pipe bursting apparatus.
Figure 2:
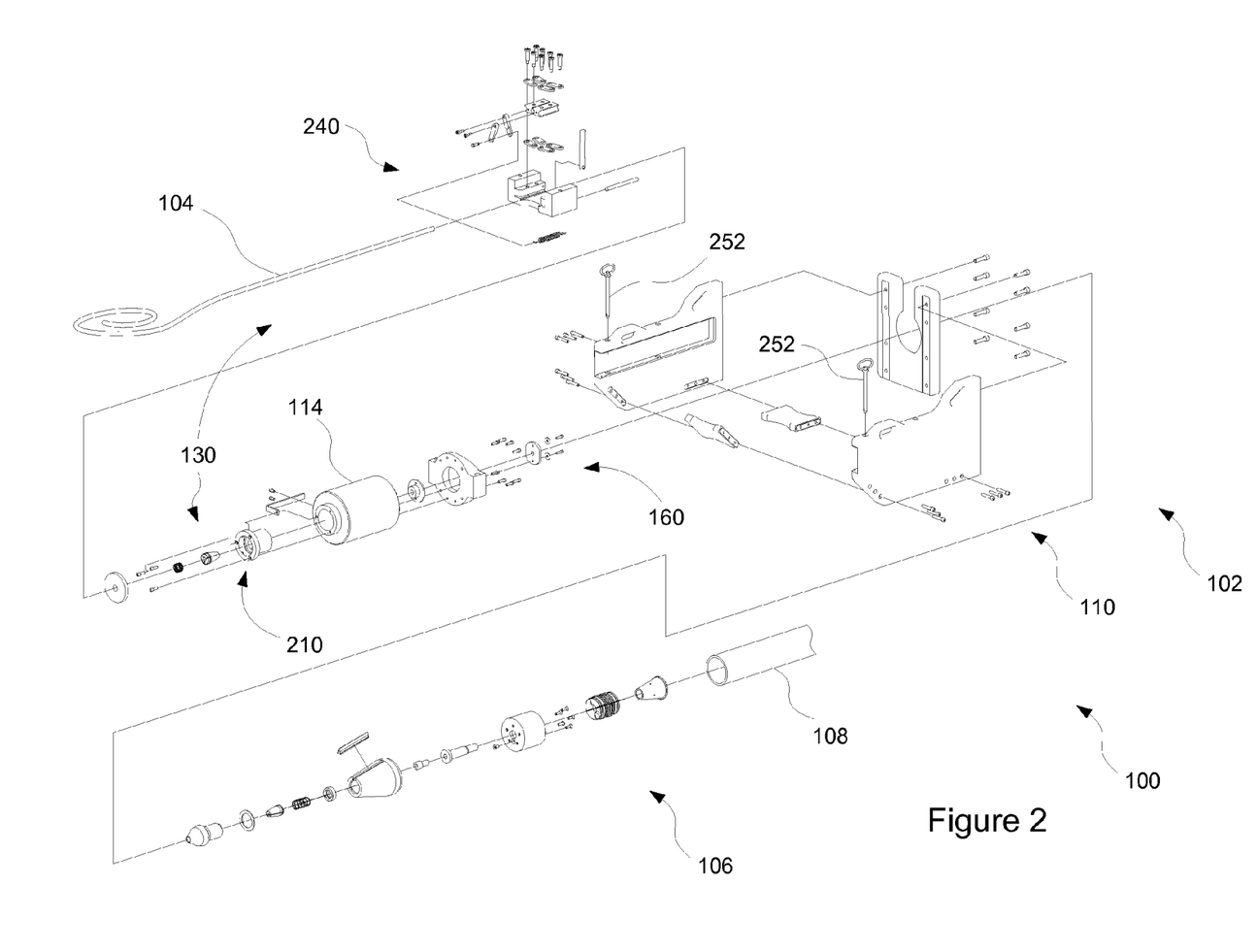
FIG. 2 is an exploded rear perspective view of the pipe bursting apparatus of FIG. 1.

Referring to FIGS. 1-2, a pipe bursting apparatus (100) will be described. The pipe bursting apparatus (100) can include a pulling apparatus (102), which can pull a cable (104) that is attached to a bursting head (106) and a pipe (108). Thus, as the pulling apparatus (102) can pull the bursting head (106) through a tunnel such as an existing pipe (not shown), the bursting head (106) can burst the existing pipe, and the attached pipe (108) can be pulled into place inside the void left by the bursting head (106).

The pulling apparatus (102) can include a frame (110) that supports a center hole ram (114) having an outer barrel (116) and a piston (118). The piston (118) can define an axial hole (120) extending through the piston (118). The pulling apparatus (102) can also include a gripping assembly (130). The gripping assembly (130) can be attached to the ram (114) and can be configured to grip a cable (104) and pull the cable (104) through the axial hole (120) in the piston (118). This pulling can occur in response to multiple pulling strokes of the piston (118) of the center hole ram (114) in a pulling direction, with each pulling stroke being followed by a recovery stroke of the piston (118) in a recovery direction that is opposite the pulling direction.

This center hole ram configuration may produce one or more benefits. For example, the center hole ram configuration may allow the pulling apparatus (102) to be lighter than existing pipe bursting pullers that have multiple rams producing comparable forces with comparable hydraulic pressures.

For example, existing pullers often include multiple rams so that a cable can be pulled between the rams, and the forces of the rams can be balanced. This can require strong structures to hold such rams in place relative to each other. The center hole ram configuration may be implemented with less weight in its structural elements than such multi-ram configurations because the center hole ram (114) can be balanced with the single ram by feeding the cable (104) through the hole in the piston (118) of the ram (114). Accordingly, the pulling apparatus (102) may be implemented with less weight in its structural elements.

Additionally, the pulling apparatus (102) can be implemented without a pulley to redirect the cable (104) before the cable (104) reaches the gripping assembly (130), as is done in many existing pipe bursting apparatuses (100). The gripping assembly (130) of the pulling apparatus (102) may be aligned with an existing pipe through which the bursting head (106) is being pulled. By not redirecting the cable (104) around a pulley, the pipe bursting apparatus (100) may provide additional benefits, such as increased cable life and increased strength for the same type of cable.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations or acts described sequentially may in some cases be rearranged or performed concurrently.

Components of the pipe bursting apparatus (100) will now be described. It should be understood that this description and the accompanying illustrations depict an example of a pipe bursting and cable pulling apparatus, and changes may be made to the structure and function of the apparatus. Also, some standard features of the apparatus (e.g., some screws for securing parts together, etc.) may not be described in detail for the sake of brevity and clarity in the description.

I. The Frame

Figure 3:
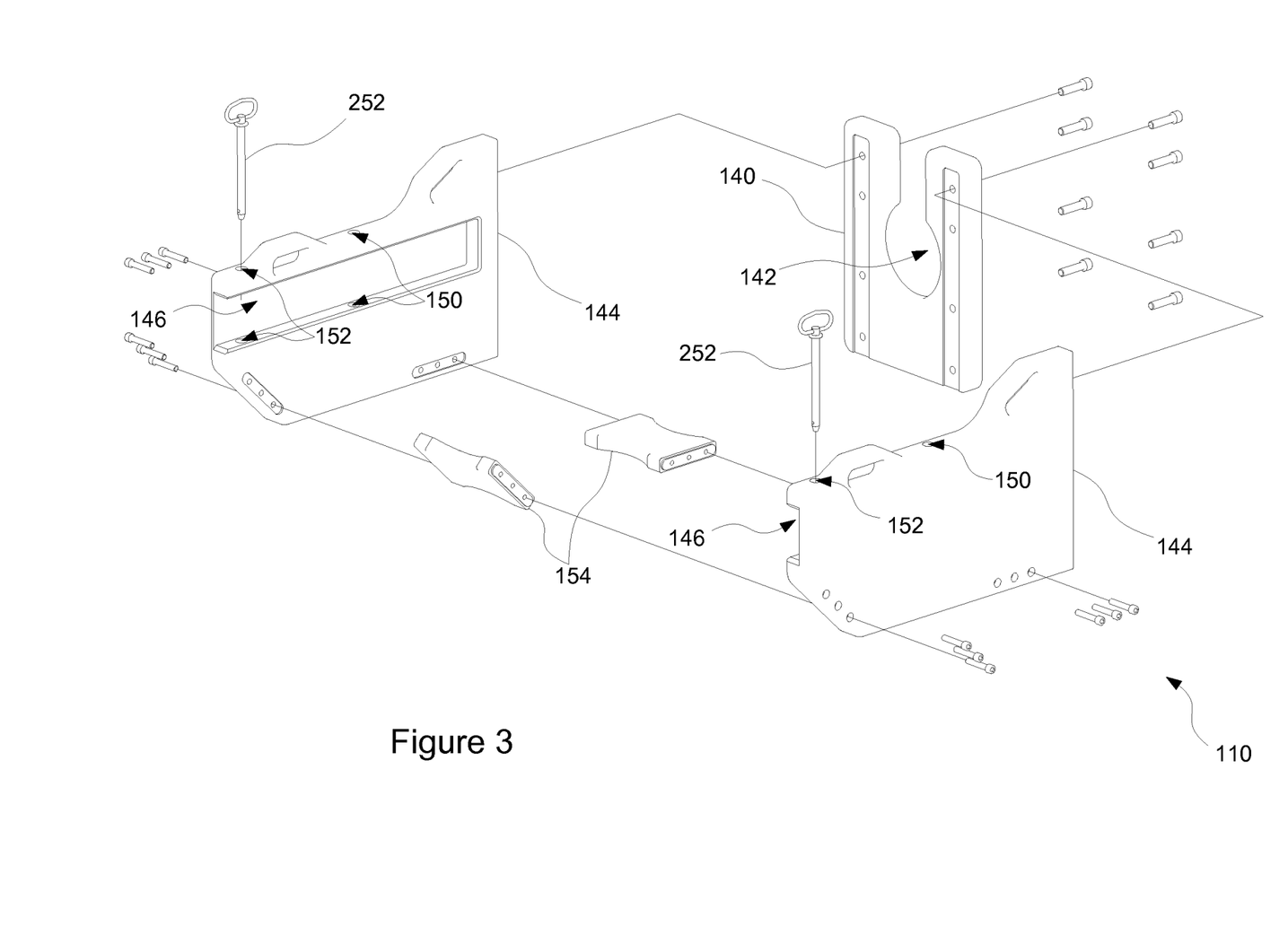
FIG. 3 is an exploded rear perspective view of a frame of the pipe bursting apparatus of FIGS. 1-2.

Referring to FIG. 3, the frame (110) can include a face plate (140), which can define a hole (142) therein that is large enough for the bursting head (106) to fit through. A pair of side panels (144) can extend back from opposite sides of the face plate (140). The side panels (144) can each define a slot (146) that opens towards the opposite side panel (144). Each slot (146) can extend forward from the back of the side panel (144), ending just short of the front of the side panel (144). Each side panel (144) can also include a front pin hole (150) and a rear pin hole (152) that both extend from a top of the side panel (144) above the slot (146) and down into the side panel (144) below the slot (146). Additionally, trusses (154) can extend between lower portions of the side panels (144) to secure the side panels (144) together. The face plate (140), side panels (144), and trusses (154) can be rigidly secured together so that the frame (110) is rigid.

The face plate (140) can be positioned against material surrounding a tunnel or hole (e.g., against material surrounding an end of an existing pipe) from which the bursting head (106) can emerge. The face plate (140) can keep the frame (110) from being pulled into the tunnel or hole. If the face plate (140) is insufficient for this purpose, an additional backup plate may be placed between the face plate and the hole, timbers may be used to brace the face plate, etc.

II. The Center Hole Ram Assembly

Figure 4:
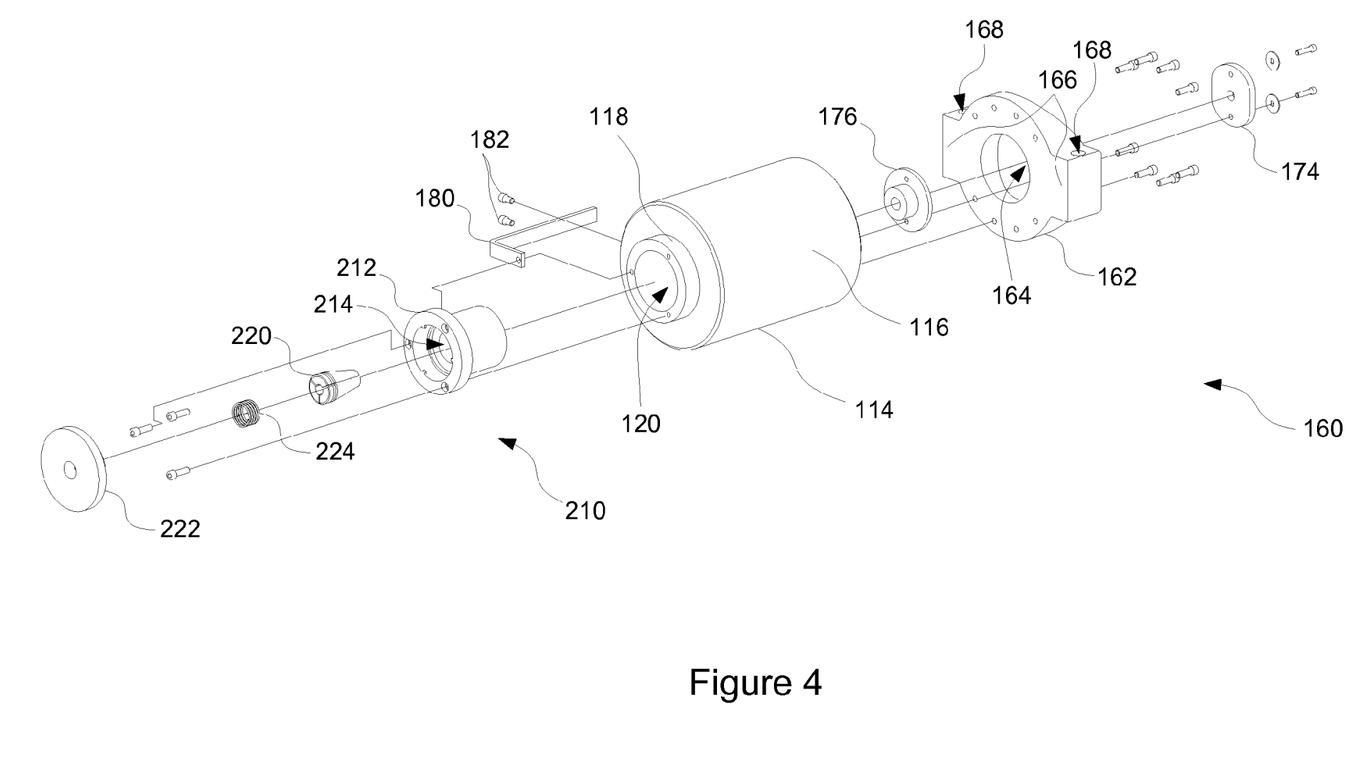
FIG. 4 is an exploded rear perspective view of a center hole ram assembly of the pipe bursting apparatus of FIG. 1.
Figure 5:
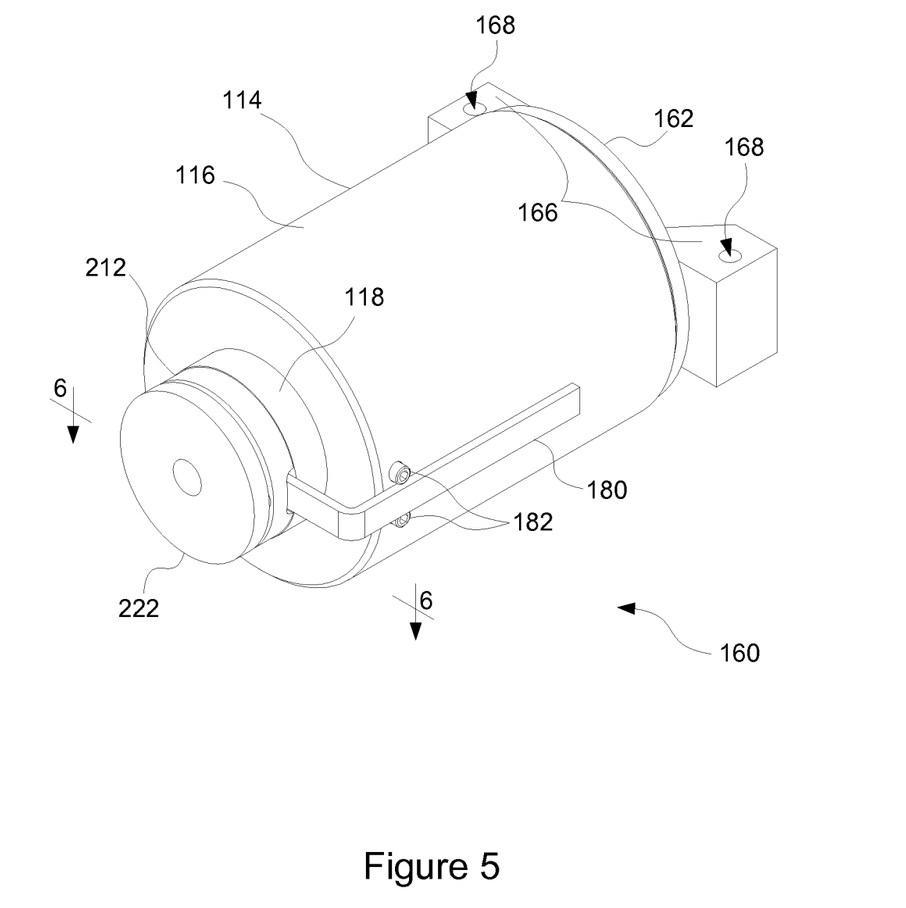
FIG. 5 is a rear perspective view of the center hole ram assembly of FIG. 4.
Figure 6:
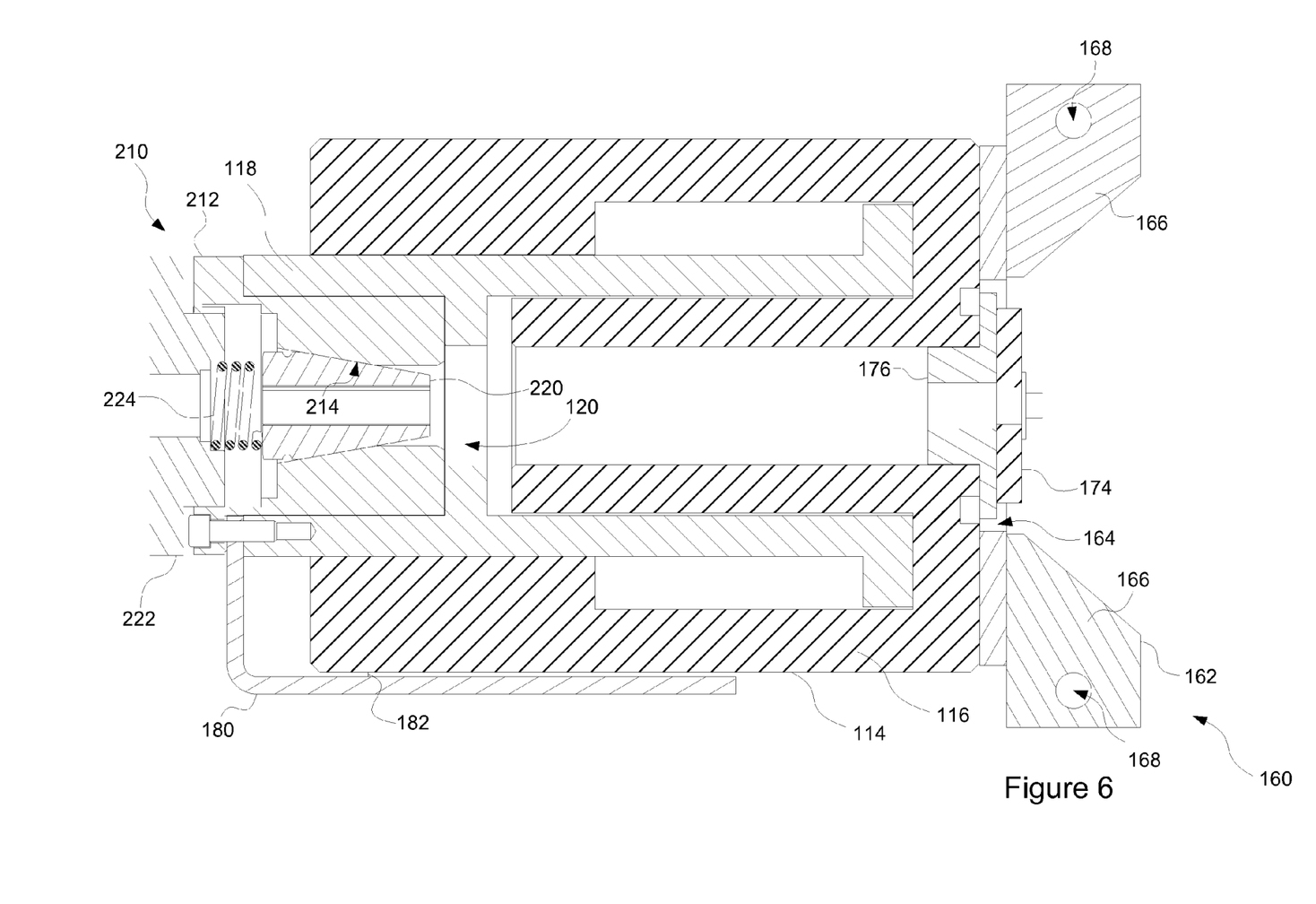
FIG. 6 is a sectional view of the center hole ram assembly taken along line 6-6 of FIG. 5.

Referring now to FIGS. 4-6, a center hole ram assembly (160) will be described. The center hole ram assembly (160) can include the center hole ram (114) and a manifold (162). The manifold (162) can define a central axial hole (164) and can include opposing protrusions (166) that can extend into the slots (146) of the side panels (144). During use, the protrusions (166) may abut front ends of the slots (146) to keep the manifold (162) from sliding further forward relative to the frame (110). The manifold (162) can also define pin holes (168) that extend through the protrusions (166) so that the pin holes (168) can be aligned with the front pin holes (150) of the side panels (144) for restaging of the center hole ram assembly (160), as will be described more below.

A cable wiper (174) can be secured to a cable wiper mount (176), and the cable wiper mount (176) can be secured to a front end of the barrel (116) of the center hole ram (114). The cable wiper (174) can be an elastomeric or rubber member that defines a hole therein that is sized so that the cable wiper (174) can wipe debris from the cable (104) as the cable (104) is fed into the center hole ram (114).

The center hole ram assembly (160) can also include an anti-rotation member or arm (180), which can be secured to the back of the piston (118). The anti-rotation arm (180) can extend radially out from the piston (118) and can extend forward along the outer barrel (116), between a pair of anti-rotation screws (182). The anti-rotation screws (182) can be screwed into the outer barrel (116). Accordingly, the anti-rotation arm (180) and anti-rotation screws (182) can inhibit rotation of the piston (118) relative to the outer barrel (116).

The center hole ram assembly (160) can also include a pulling gripper assembly (210), which can also be part of the overall gripping assembly (130). The pulling gripper assembly (210) can include a pulling gripper housing (212), which can be secured to the piston (118). The gripper housing (212) can include an inner tapered surface (214) around at least a portion of an axial hole through the gripper housing. A pulling gripper (220) can be seated within the gripper housing (212). The pulling gripper (220) can include multiple sections that are able to squeeze together or expand apart. The sections may be attached together. For example, the sections may be attached together with one or more cables extending between the sections, by one or more O-rings extending around the sections or in some other manner. For example, the sections may be part of a unitary member. The sections can each include inwardly-facing gripping surfaces such as barbs or ridges that are slanted rearward (similar to female threads). The sections of the pulling gripper (220) can be squeezed inwardly by the tapered surface (214) of the gripper housing (212). Accordingly, as more force is applied by the pulling gripper (220) pulling the cable (104) rearward, the pulling gripper (220) can be pulled forward relative to the gripper housing (212), so that the pulling gripper (220) tightens its grip on the cable (104).

Referring still to FIGS. 4-6, the pulling gripper assembly (210) can further include a cover (222) that can be secured to the gripper housing (212). A compression spring (224) can be seated between the cover (222) and the pulling gripper (220). The cover (222) may be a twist-lock type of cover, and the compression spring (224) can hold the cover (222) against the gripper housing (212) to maintain the cover (222) in a locked position. Additionally, the compression spring (224) can bias the pulling gripper (220) forward into the tapered surface (214) of the gripper housing (212) to keep the pulling gripper (220) together and in contact with the cable (104) so that the pulling gripper (220) will grip the cable (104) to pull the cable rearward if the pulling gripper (220) is moved rearward by the piston (118) and the gripper housing (212).

III. Holding Gripper Assembly

Figure 7:
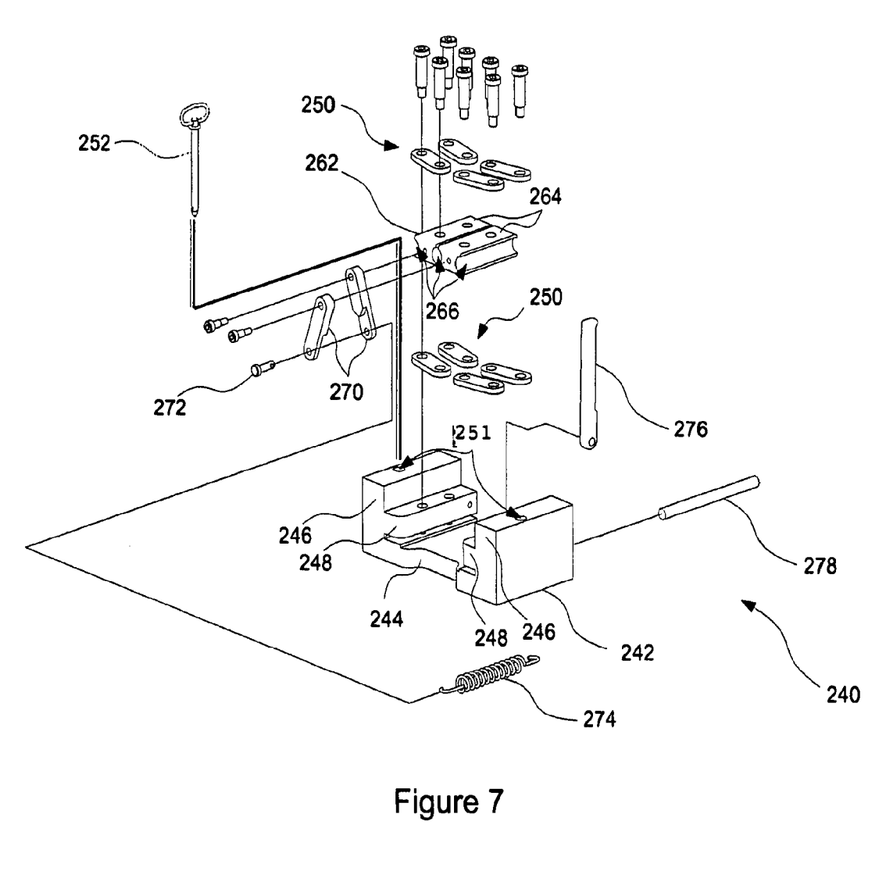
FIG. 7 is an exploded rear perspective view of a holding gripper assembly of the pipe bursting apparatus of FIGS. 1-2.

The gripping assembly (130) can also include a holding gripper assembly (240), which will now be described. Referring now to FIGS. 1 and 7, the holding gripper assembly (240) can include a holding base (242), which can include a bottom plate (244) and a pair of side plates (246) extending up from opposite sides of the bottom plate (244). The holding base (242) can also include protrusions (248) extending in from the side plates (246) parallel to the bottom plate (244).

The side plates (246) can each define a vertically-extending pin hole (251) that can receive a pin (252) (see FIGS. 1 & 3) that also extends into a rear pin hole (152) of a corresponding side panel (144) into which the corresponding side plate (246) is slid. Accordingly, the pins (252) can secure the holding base (242) to the frame (110).

Mounting arms (250) can be secured to the protrusions (248) so that the mounting arms (250) can pivot about pivot points on the protrusions (248). For example, two mounting arms (250) can be attached to and extend in from the top of each protrusion (248), and two mounting arms (250) can be attached to and extend in from the bottom of each protrusion (248). The mounting arms (250) can all be the same length so that pairs of top and bottom mounting arms (250) can be vertically aligned with each other as the mounting arms (250) pivot.

A holding gripper (262) can include a pair of gripping members (264). Each gripping member (264) can be attached to the mounting arms (250) that are attached to one of the protrusions (248) of the holding base (242). Thus, the gripping members (264) can be positioned between the protrusions (248). Each gripping member (264) can define a channel (266) that opens toward the other gripping member (264) and extends between the front and rear of the gripping member (264). For example, each of the channels (266) can be a semi-cylindrical or half-pipe shaped channel. The channels (266) can include gripping surfaces, such as ridges that can be shaped to grip onto the cable (104) between the gripping members (264). Each gripping member (264) may also include an opposite channel (266) that opens away from the other gripping member (264). For each gripping member, the opposite channels (266) may be two different sizes, and the gripping members (264) can removed, flipped over, and re-attached to the mounting arms (250) to accommodate different cable sizes to be pulled.

The holding gripper assembly (240) can also include a pair of pivot arms (270). Each pivot arm (270) can have one end that is pivotally attached to the other pivot arm (270) with a pin (272) and an opposite end that is pivotally attached to one of the gripping members (264). Thus, the pivot arms (270) can form a V-shape. A tension spring (274) can be attached at one end to the pin (272) and at an opposite end to a front side of the holding base (242). Thus, the tension spring (274) can bias the pivot arms (270) and the gripping members (264) forward. The mounting arms (250) can force the gripping members (264) toward each other as the gripping members (264) pivot forward. Accordingly, the biasing force of the tension spring (274) can keep the gripping members (264) against the cable (104) between the gripping members. Additionally, the gripping members (264) can apply more gripping force to hold the cable (104) between the gripping members (264) as the cable (104) pulls forward on the gripping members (264) with more force.

The holding gripper assembly (240) can also include a handle (276) that can be pivotally attached to the holding base (242). The handle (276) can be pivoted rearward to engage and pivot the gripping members (264) forward and out, so that the grip of the gripping members (264) on the cable (104) can be loosened and the cable (104) can be pulled upward and removed from the gripping members (264) without an end of the cable (104) having to be pulled through the gripping members (264).

Referring to FIGS. 1-4, the holding gripper assembly (240) can also include a stay (278), which can extend back from the holding base (242) of the holding gripper assembly (240) to engage the barrel (116) of the center hole ram (114) in the center hole ram assembly (160). Thus, the stay (278) can maintain spacing between the barrel (116) and the holding base (242). As noted, the holding base (242) can be secured to the side panels (144) of the frame (110) with the pins (252) extending into the rear pin holes (152) of the side panels (144) and through the pin holes (250). Accordingly, the stay (278) can prevent the barrel (116) from sliding rearward during use. As discussed above, the barrel (116) can also be kept from sliding forward during use because the protrusions (166) of the manifold (162), which is secured to the barrel (116), can abut the forward ends of the slots (146) in the side panels (144).

IV. The Bursting Head

Figure 8:
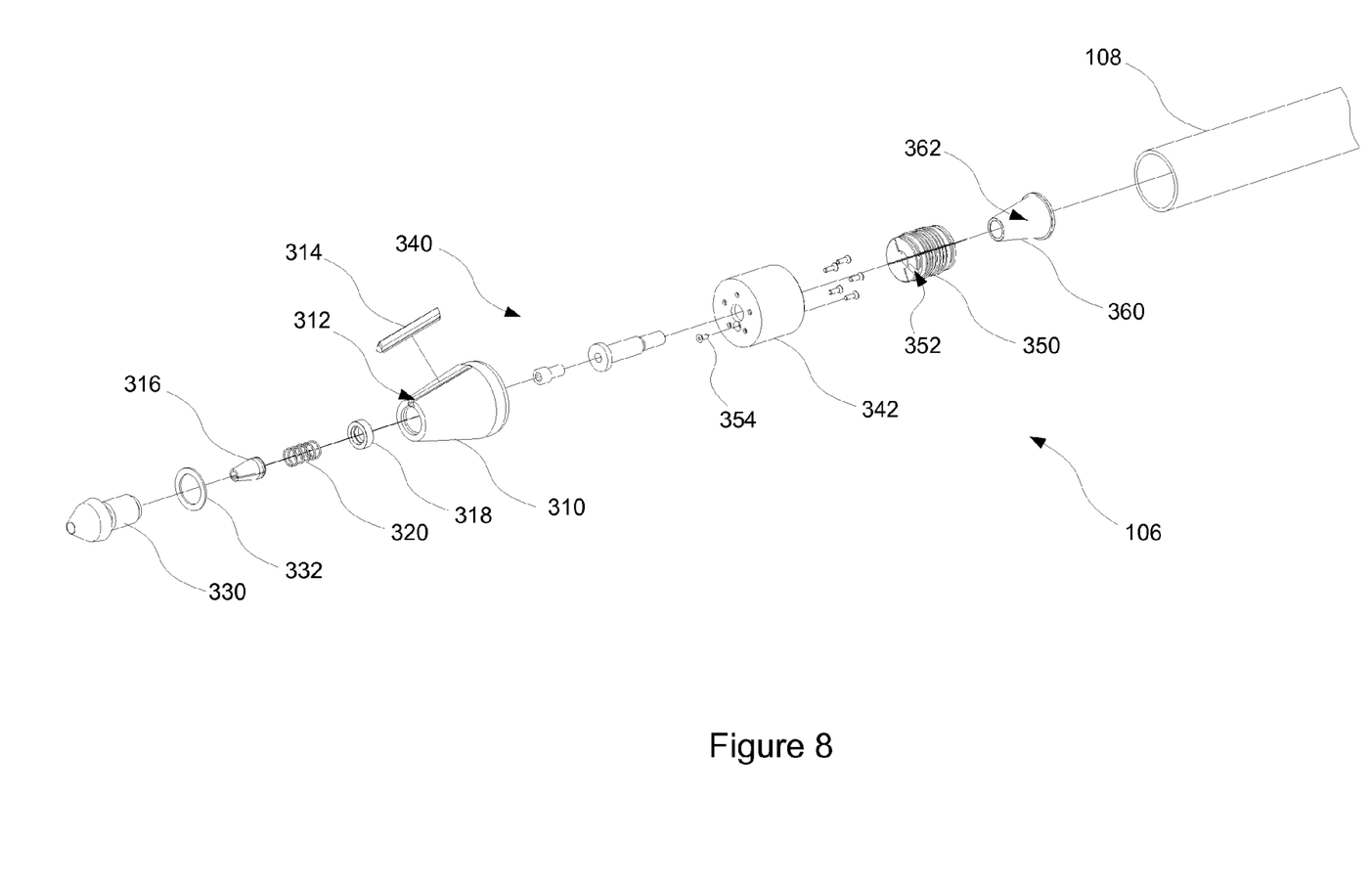
FIG. 8 is an exploded rear perspective view of a bursting head and replacement pipe of the pipe bursting apparatus of FIGS. 1-2.

Referring to FIG. 8, an example of a bursting head (106) will now be described in more detail. The bursting head (106) can include a hollow center cone (310). The center cone (310) can define a T-shaped groove (312) extending from the front of the center cone (310) along the exterior of the cone. A fin or blade (314) can include a T-shaped cross-sectional portion that can slide into the groove (312), with the fin (314) extending out from the center cone (310).

A bursting head cable gripper (316) can be positioned within the center cone (310). The bursting head cable gripper (316) can be the same as the pulling gripper (220) discussed above, or it may be a different gripper. A spring seat (318) can be positioned in front of the bursting head cable gripper (316), and a compression spring (320) can be seated between the spring seat (318) and the bursting head cable gripper (316). A nose cone (330) can be secured to the center cone (310). For example, the nose cone (330) may include male threads that mate with female threads on the center cone (310). A nose cone washer (332) can be positioned between the nose cone (330) and the center cone (310). For example, the washer (332) may be a polymer washer such as a nylon washer that can make it easier to unscrew the nose cone (330) from the center cone (310). The nose cone (330) can be hollow, and it can include a tapered surface (not shown) similar to the tapered surface (214) of the gripper housing (212). Accordingly, if the pulling gripper (220) is pulled backward with additional force by the cable (104), the pulling gripper (220) can be compressed inward by the tapered surface of the nose cone (330) to apply additional gripping force on the cable (104).

The bursting head (106) can also include a shoulder screw (340), which can include a main shoulder screw body. An engageable portion of a head of the shoulder screw may be formed by another screw. For example, a hexagonal socket head cap screw may be tightened into the head of the shoulder screw body, and secured to the shoulder screw body with a material such as the adhesive material sold under the name LOCTITE®. A pipe gripper housing (342) can be a cup-shaped member with a radial wall that abuts the large end of the center cone (310) and a circumferential wall that extends forward from the radial wall. The radial wall of the pipe gripper housing (342) can be fastened to the front (large) end of the center cone (310).

Continuing with the description of the bursting head (106), a pipe gripper (350) can be a generally cylindrical member that can include multiple sections that can expand or contract to squeeze a rear end of the pipe (108) between the pipe gripper (350) and an inner surface of the circumferential wall of the pipe gripper housing (342). The outer surfaces of the sections of the pipe gripper (350) can form engaging members, such as barbs or ridges, which can engage the pipe (108). The engaging members can extend rearward into the pipe (108), to grip the pipe as the bursting head (106) pulls the pipe rearward. When the pipe gripper (350) is not secured in the bursting head (106), the separate sections of the pipe gripper can be held together by O-rings that fit into grooves extending around the pipe gripper (350), or the sections could be formed as a single part or held together in some other manner. For example, the sections of the pipe gripper (350) could be held together with one or more cables extending between the sections. The pipe gripper (350) can define an anti-rotation recess (352) that faces rearward and receives an anti-rotation screw (354). The anti-rotation screw (354) can extend through the radial wall of the pipe gripper housing (342) to prevent the pipe gripper (350) from rotating relative to the pipe gripper housing (342) and the center cone (310).

The bursting head (106) can also include a pipe gripper mandrel (360), which can taper from a rear small-diameter end to a forward large-diameter end. The pipe gripper mandrel (360) can fit partially inside the pipe gripper (350), so that as the pipe gripper mandrel is pulled rearward into the pipe gripper (350), the pipe gripper (350) can expand to grip the pipe (108) tighter. The interior of the pipe griper mandrel (360) can be threaded to mate with the threaded end of the shoulder screw (340), so that the shoulder screw can be tightened into the pipe gripper mandrel (360) to draw the pipe gripper mandrel (360) rearward into the pipe gripper housing (342), expanding the pipe gripper (350). The pipe gripper mandrel (360) can include holes (362), which can receive pins (such as rolled pins, which are not illustrated) that can extend between the sections of the pipe gripper (350) to keep the pipe gripper mandrel (360) from rotating relative to the remainder of the bursting head (106) as the shoulder screw (340) is tightened into the pipe gripper mandrel (360).

V. Fastening and Materials

The apparatus (100) can include various fasteners such as screws, which are illustrated in various figures but most of which are not discussed herein in detail. In addition to and/or instead of the illustrated screws, other types of fasteners may used, such as nuts and bolts, rivets, welds, etc.

The various parts of the pipe bursting apparatus (100) can be made with standard materials that are sufficiently strong, durable, and rigid for their functions, as described herein. Additionally, it can be beneficial to make the parts out of lightweight materials so that the pipe bursting apparatus can be lighter and more easily handled by a worker.

As an example, the cable (104) can be a standard cable, such as a 0.625 inch diameter cable. The cable (104) can be used without the cable having a swaged end. The cable (104) may have its ends welded to keep the cable from unraveling.

The cable grippers (220, 262, and 316) may all be made of hardened steel, such as E9310 steel that is hardened by carbonizing up to a range of 58 to 62 Rockwell hardness. The mounting arms (250) for the holding gripper (262) may be hardened steel, such as hardened 4140 steel. Many of the structural parts can be aluminum. For example, the holding base (242) for the holding gripper (262), the frame face plate (140), the frame side panels (144), the frame trusses (154), and the manifold (162) may all be aluminum. For example, the holding base (242) may be 7075 aluminum. The pivot arms (270) may be mild steel. Also, a bushing may be included where the screws for the mounting arms (250) extend into the holding base (242).

The center hole ram (114) may be constructed using aluminum for the outer barrel (116) and the piston (118). The center hole ram (114) can be hydraulic ram that is sized to provide sufficient force for pulling the bursting head (106). The hydraulic lines and hydraulic pump for operating the center hole ram (114) can be standard. For example, a hydraulic pump of a tractor or similar machinery may be used to operate the center hole ram (114). As an example, the center hole ram (114) may operate with 1500 pounds of hydraulic pressure per square inch.

VI. Cable Pulling and Pipe Bursting Apparatus Operation

A pipe bursting technique will now be described. The technique can include attaching a bursting head to a pipe. For example, this can include assembling the bursting head (106) as described above, including inserting the new pipe (108) between the pipe gripper (350) and the pipe gripper housing (342). With the nose cone (330), washer (332), and compression spring (320) removed, a wrench such as hexagon-shaped wrench can be used to tighten the shoulder screw (340) to pull the pipe gripper mandrel (360) rearward, and expand the pipe gripper (350) to grip the pipe (108).

Additionally, the bursting head can be attached to a cable. For example, the nose cone (330), washer (332), and compression spring (320) can be re-attached to the center cone (310). A front end of the cable (104) can be inserted through the nose cone (330) and through the bursting head cable gripper (316), so that the bursting head cable gripper (316) grips the cable (104) and prevents the cable (104) from being detached from the bursting head (106). The cable can be fed through the existing pipe so that the front end of the cable (104) is attached to the bursting head (106), and an opposite rear end of the cable (104) emerges from an opposite end of the existing pipe where the pulling apparatus is to be positioned for use.

The pulling apparatus (102) can be assembled as described above, the pulling apparatus (102) being typically positioned within a hole or trench where the existing pipe ends, with the face plate (140) pressing against a wall of earth surrounding the existing pipe end. The axis of the center hole ram (114) and the cable grippers (220, 262) can be aligned with an axis of the existing pipe. The rear end of the cable (104) can be fed through the hole in the face plate (140), though the cable wiper (174), through the piston (118) of the center hole ram (114), through the pulling gripper (220), and through the holding gripper (262).

The piston (118) of the center hole ram (114) can then be actuated back and forth using hydraulic controls. For example, the piston (118) can be actuated rearward in a pulling stroke (in a pulling direction). This actuation can result in the pulling gripper housing (212) moving rearward, which can squeeze the pulling gripper (220) around the cable and pull the cable rearward. During this motion, the cable (104) can slide through the holding gripper (262). Pulling the cable (104) can pull the bursting head (106) rearward, so that the bursting head (106) can burst a portion of the existing pipe, widen the hole, and draw the new pipe (108) rearward. The piston (118) can then be actuated forward in a recovery stroke in a recovery direction to ready the piston (118) for another pulling direction stroke. As the piston does so, the cable (104) can attempt to pull forward. However, this forward pulling force can tighten the grip of the holding gripper (262) on the cable, so that the holding gripper can inhibit forward pulling of the cable (104) during the recovery stroke of the piston (118). During this recovery stroke, the pulling gripper (220) can loosen its grip on the cable (104) and slide over the cable (104).

These pulling and recovery strokes of the piston (118) can be repeated until the bursting head reaches the face plate (140). At this point, the bursting head (106) may not have fully emerged from the existing pipe. The holding gripper assembly (240) can be removed at that time. This can be done by removing the pins (252) from the side panels (144), pulling back on the handle (276) to move the holding gripper (262) forward and loosen the grip of the holding gripper (262) on the cable (104), and sliding the holding gripper assembly (240) from the slots (146) in the side panels (144).

The center hole ram assembly (160) can then be slid rearward until the pin holes (168) in the manifold (162) align with the front pin holes (150) in the side panels (144), and the pins (252) can be inserted to hold the center hole ram assembly (160) in place. This can restage the center hole ram assembly (160) to a restaged position rearward of its regular operating position, so that an additional pulling actuation of the piston (118) can draw the bursting head (106) form the existing pipe hole (the hole formed by bursting the existing pipe) and can also draw a portion of the new pipe (108) from the existing pipe hole.

The cable (104) can be removed from the bursting head (106). This can include unscrewing the nose cone (330) from the center cone (310). The nose cone (330), washer (332), bursting head cable gripper (316), and spring (320) can be slid rearward on the cable (104). The cable (104) can be removed from the center cone (310), and the nose cone (330), washer (332), bursting head cable gripper (316), and spring (320) can be slid rearward and off the cable (104). The front end of the cable (104) can then be pulled or fed through the piston (118), through the pulling gripper (220), and out of the pulling apparatus (102). The pulling apparatus (102) may be removed, and the bursting head (106) can be removed from the new pipe (108). This can leave a portion of the new pipe (108) protruding out of the existing pipe hole so that additional plumbing can be attached to that portion.

To remove the bursting head (106) from the new pipe (108), a tool (such as a hexagonal-shaped wrench) can be used to unscrew the shoulder screw (340) from the pipe gripper mandrel (360). This can allow the pipe gripper (350) to loosen from the pipe (108) so that the pipe gripper (350) and the pipe gripper mandrel (360) can be removed from within the new pipe (108).

While the invention has been particularly shown and described with reference to preferred embodiments thereof, it will be understood by those skilled in the art that various changes in form and details may be made therein without departing from the spirit and scope of the invention. For example, the grippers may be configured differently than what is shown. As an example of such a difference, the pulling gripper may be configured similarly to the holding gripper illustrated above. As another example, in the illustrated embodiment described above, the pulling gripper is attached to the piston of the center hole ram, and the holding gripper is attached to the barrel of the center hole ram. However, a holding gripper may be attached to a piston of a center hole ram, and a pulling gripper may be attached to a barrel of the center hole ram.

We claim:

1. An apparatus for pulling cable comprising a frame, a retractable center hole ram and manifold assembly, and a cable gripping assembly, wherein:

said frame comprises a face plate defining a hole and two side panels extending back from opposite sides of said face plate, each of said two side panels comprising a pin hole extending from the top of the side panel down into said panel;

said center hole ram comprises a barrel housing a piston therein, said piston defining an axial hole extending therethrough for receiving said cable and comprising an anti-rotation member secured to the back of said piston, extending radially therefrom and extending forward along said barrel so as to inhibit rotation of said piston relative to said barrel;

said manifold, attached to said barrel and extending forward therefrom, defines a central axial hole for receiving said cable and comprises opposing protrusions, each said protrusion comprising a pin hole that can be aligned with the pin hole of said corresponding side panel such that said central hole ram and manifold assembly can be retracted within said frame away from said face plate and held in said retracted position; and a pin competent to fit in said pinholes and hold said central hole ram and manifold assembly in said retracted position within said frame.

2. The apparatus of claim 1 wherein each of said two side panels defines a slot that opens relative to the opposite side panel and is competent to receive a said protrusion from said manifold such that said manifold can slide back within said frame.

3. The apparatus of claim 2 wherein slot ends just short of the front end of each said side panel.

4. The apparatus of claim 1 wherein said face plate hole is large enough to receive a pipe bursting head.

5. The apparatus of claim 1 wherein said anti-rotation member extends forward along said barrel between a pair of anti-rotation screws.

6. The apparatus of claim 1 wherein said cable gripping assembly is configured to grip and pull a cable through the axial hold of said piston.

7. The apparatus of claim 1 wherein said cable gripping assembly comprises part of a bursting head cone.

8. An apparatus for pulling bursting head and cable through a tunnel comprising a frame, a retractable center hole ram and manifold assembly, and a cable gripping assembly, wherein:

said cable gripping assembly comprises part of said bursting head;

said frame comprises a face plate defining a hole large enough to receive said bursting head and two side panels extending back from opposite sides of said face plate, each of said two side panels defining a slot that opens relative to the opposite side panel and is competent to receive a protrusion from said manifold such that said manifold can slide back within said frame, each said slot ending just short of the front end of each said side panel, each of said two side panels further comprising a pin hole extending from the top of the side panel down into said panel;

said center hole ram comprises a barrel housing a piston therein, said piston defining an axial hole extending therethrough for receiving said cable and comprising an anti-rotation member secured to the back of said piston, extending radially therefrom and extending forward along said barrel such that it inhibits rotation of said piston relative to said barrel;

said manifold, attached to said barrel and extending forward therefrom, defines a central axial hole for receiving said cable and comprises opposing protrusions, each said protrusion comprising a pin hole that can be aligned with the pin hole of said corresponding side panel such that said central hole ram and manifold assembly can be retracted within said frame away from said face plate and held in said retracted position, and a pin competent to fit in said pinholes and hold said central hole ram and manifold assembly in said retracted position within said frame.

9. A method for pulling a pipe bursting head through a tunnel, the method comprising:
a) providing a bursting head attached to a pipe by means of a pipe gripper;
b) providing an apparatus for pulling cable comprising a frame and a retractable center hole ram and manifold assembly, wherein:
said frame comprises a face plate defining a hole large enough to receive said bursting head and two side panels extending back from opposite sides of said face plate, each said side panel defining a slot that opens relative to the opposite side panel and is competent to receive a protrusion from said manifold such that said manifold can slide back within said frame, and each of said two side panels further comprising a pin hole extending from the top of the side panel down into said panel;
said center hole ram comprises a barrel housing a piston therein, said piston defining an axial hole extending therethrough for receiving said cable and comprising an anti-rotation member secured to the back of said piston, extending radially therefrom and extending forward along said barrel such that it inhibits rotation of said piston relative to said barrel; and
said manifold, attached to said barrel and extending forward therefrom, defines a central axial hole for receiving said cable and comprises opposing protrusions, each said protrusion comprising a pin hole that can be aligned with the pin hole of said corresponding side panel such that said central hole ram and manifold assembly can be retracted within said frame away from said faceplate and held in said retracted position;
c) attaching the front end of said cable to a bursting head by means of a cable gripping assembly;
d) inserting the rear end of said cable through said face plate hole and the central axial holes of said piston and manifold of said pulling apparatus;
e) pulling said bursting head through said tunnel by means of said cable until said bursting head appears from said tunnel and abuts said face plate;
(f) retracting said central hole ram and manifold assembly back along said slots such that the pinholes on the manifold protrusions now are aligned with the corresponding pin holes on said frame side panels,
(g) holding said assembly in said retracted position by placing pins in said aligned pin holes, and
(h) pulling said bursting head through said face plate and into said frame, and disconnecting said bursting head from said cable and said pipe.

10. The method of claim 9 wherein the rear end of said cable is provided to said apparatus before the front end is attached to said bursting head.

* * * * *